United States Patent [19]

Anetsberger et al.

[11] 4,395,216

[45] Jul. 26, 1983

[54] DOUGH PERFORATOR

[75] Inventors: Richard J. Anetsberger; John A. Anetsberger, both of Northbrook, Ill.

[73] Assignee: Anetsberger Brothers, Inc., Northbrook, Ill.

[21] Appl. No.: 326,608

[22] Filed: Dec. 2, 1981

[51] Int. Cl.³ .................... B29C 17/08; A21C 11/10
[52] U.S. Cl. .................... 425/290; 83/348; 83/658; 83/678; 425/302.1; 425/363; 425/DIG. 37
[58] Field of Search ............ 425/290, 296, 302.1, 425/308, DIG. 37, 363, 374; 83/332, 349, 658, 678

[56] References Cited

U.S. PATENT DOCUMENTS

| 475,607 | 5/1892 | Petersen | 425/296 |
|---|---|---|---|
| 1,433,971 | 10/1922 | Roberts | 425/290 |
| 2,309,543 | 1/1943 | Sawyer | 425/290 |
| 3,225,634 | 12/1965 | Becker | 83/658 |
| 3,355,974 | 12/1967 | Carmichael | 425/290 |
| 3,845,682 | 11/1974 | Willhite et al. | 83/678 |
| 4,167,130 | 9/1979 | Miller | 83/678 |
| 4,340,342 | 7/1982 | Kim | 425/296 |

Primary Examiner—Willard E. Hoag
Attorney, Agent, or Firm—McCaleb, Lucas & Brugman

[57] ABSTRACT

Dough sheet perforator comprising plurality of axially spaced and aligned star wheels rotating against individual resilient backup members as sheeted dough is passed therebetween to assure complete dough perforation resulting from extended scraping action of teeth of star wheels along associated backup members.

8 Claims, 4 Drawing Figures

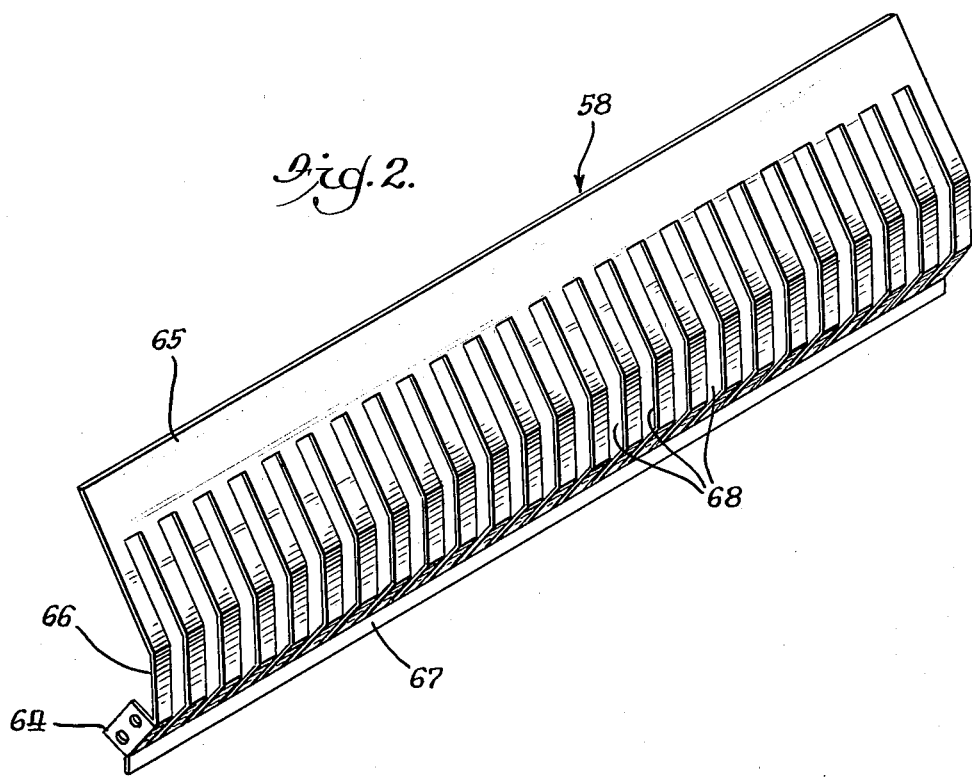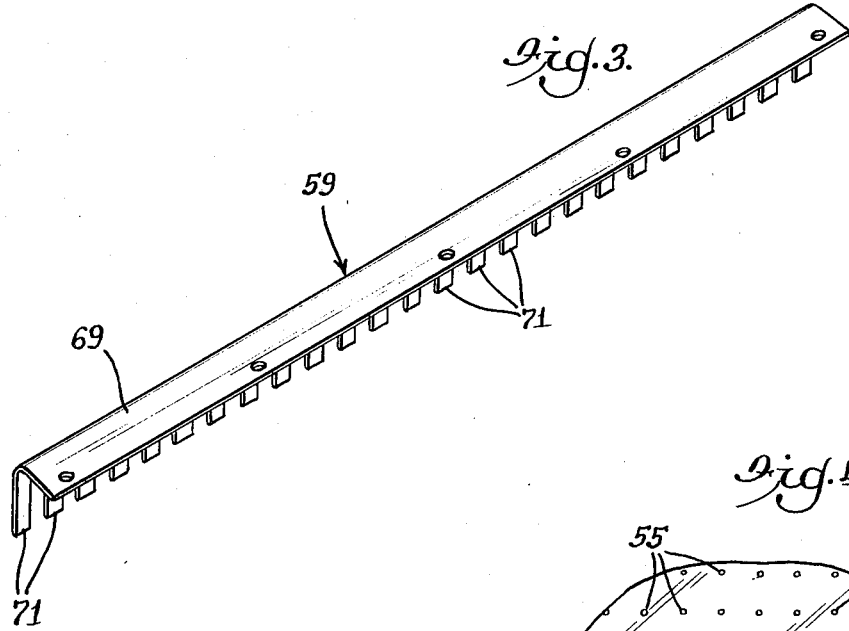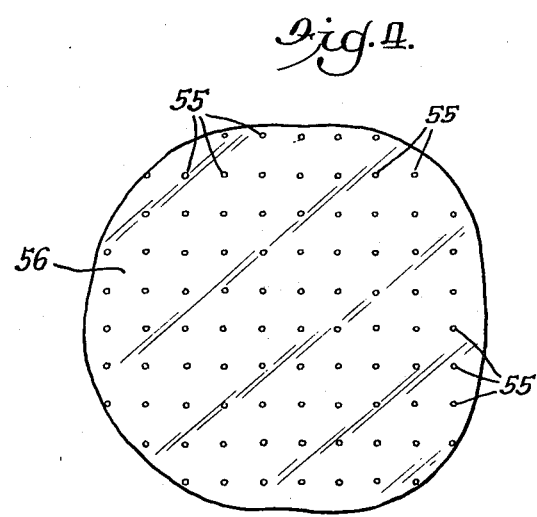

DOUGH PERFORATOR

BACKGROUND OF THE INVENTION

1. Field of the Invention

This invention relates generally to dough sheeters, and more particularly to those employed for rolling dough for use in baking pizzas.

2. Description of the Prior Art

Apparatus for rolling or sheeting dough for various end products has been provided in many forms, such as that for sheeting dough for pizza skins disclosed in U.S. Pat. No. 4,255,106. A problem encountered in the subsequent baking of the pizzas is "blistering" of the skins, namely, irregular upward movement or expansion of portions thereof from the supporting pans, which results in scorching or burning of the cheese and other ingredients that have been placed thereon.

In individual assembly for baking of pizzas, perforation of the skins has been attempted by first manually moving a spiked roller over the skins on the baking pans. While that was not completely satisfactory due to the nature of the dough which, because of its "memory," tends to close such perforations and form a thin membrane across their lower ends which does not prevent blistering during baking, the latter was aborted by the baker reaching into the oven and with a stick, or the like, manually breaking or knocking down any resulting blisters.

However, the expanding use of high speed conveyor-type ovens, now deemed essential in fast-food retail operations and in commercial production of pizzas as shelf items, prevents such selective manual breaking of forming blisters and, therefore, requires some new method and apparatus for insuring against the forming of any dough blisters. Recognizing this, attempts have been made to effectively and completely perforate the sheeted dough by incorporating an axially aligned and spaced gang of star wheels in a dough sheeter, such as that of U.S. Pat. No. 4,255,106, for cooperation with the lowermost dough roller therein. Those attempts have failed because of the difficulty of maintaining accurate alignment and engagement of the individual star wheels with their backup roller and despite the use of a separate backup roller and different materials therefor.

SUMMARY OF THE INVENTION

In working on the problems hereinbefore noted, applicants discovered that a lineal scraping action of a dough perforating member relative to the sheeted dough and a backing member would insure complete and effective dough perforation to prevent formation of any thin membrane and thereby avoid any subsequent blistering of the dough during baking. To assure such dough perforation, a novel perforator has been incorporated in a sheeter to which the rolled dough is automatically directed which comprises an axially aligned and spaced set of rotating dough sheet perforating members, such as star wheels, and a self-adjusting backup unit comprising resilient members individually cooperating with the perforating members and with which the latter will have a surface scraping action rather than mere point contact.

In the drawings:

FIG. 2 is a perspective view of a slotted guide member for directing a dough sheet to and past a toothed perforator and separating the perforated sheet therefrom;

FIG. 3 is a perspective view of a resilient backup member which cooperates with the toothed perforator; and FIG. 4 is a plan view of a rolled and perforated dough sheet or pizza skin.

DESCRIPTION OF THE PREFERRED EMBODIMENT

Figure 1:
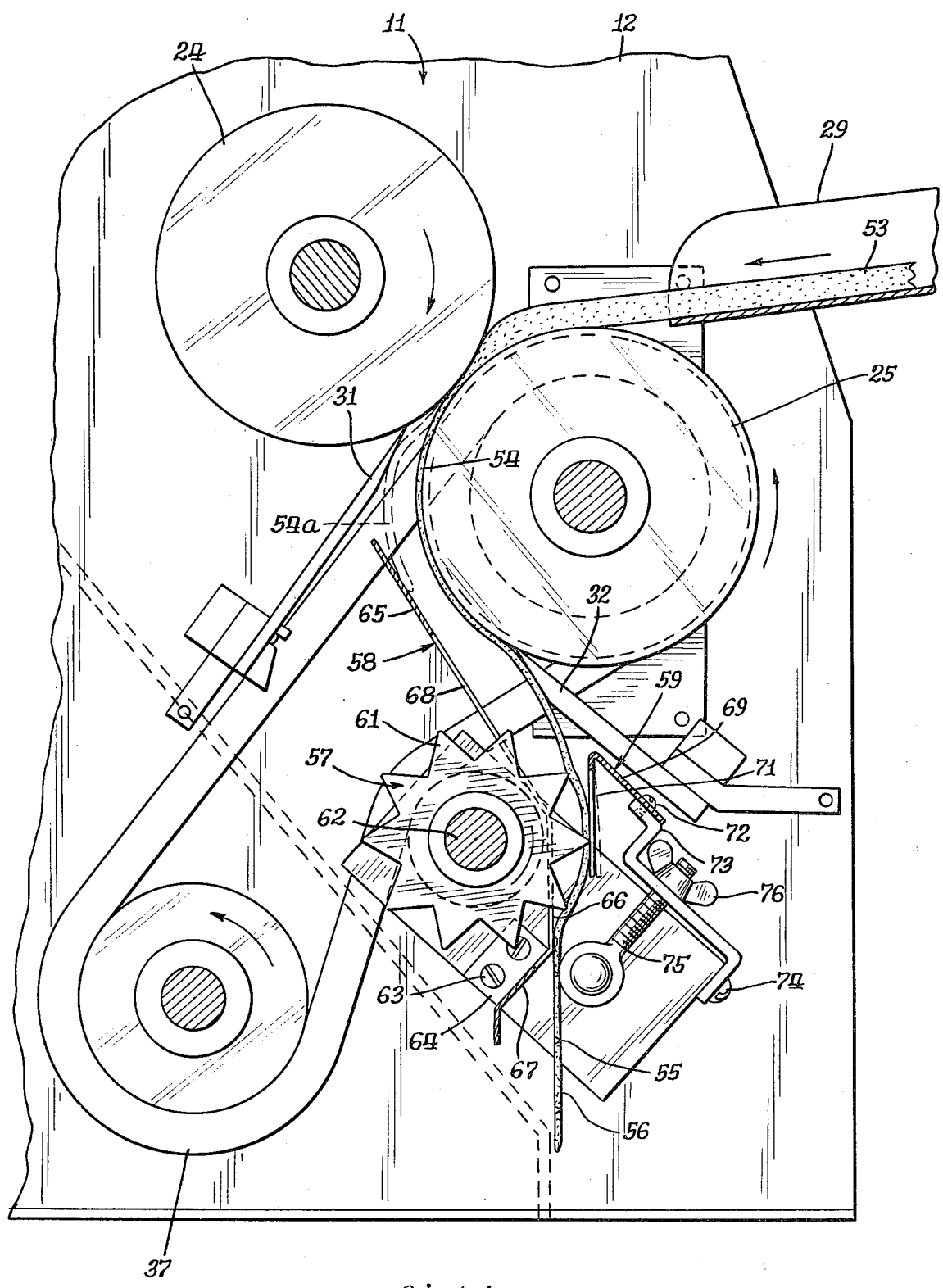
FIG. 1 is a vertical end sectional view of a portion of a dough sheeter embodying the features of the invention.

The preferred embodiment is illustrated for convenience as being incorporated in a countertop pizza dough double sheeter like that disclosed in U.S. Pat. No. 4,255,106 which is designated generally by reference numeral 11 with a suitable support and outer casing means 12; second stage upper and lower rollers 24 and 25, respectively; a tray 29 for receiving a dough piece sheeted by the rollers of a first stage (not shown herein) and from which it is moved into contact with the second stage rollers 24, 25; dough scrapers 31 and 32, respectively, extending longitudinally and engaging the outer surfaces of the rollers 24 and 25; and drive means including endless chain or belt means 37 for rotating the dough rollers. These several parts are identified by the same reference numerals employed in that patent.

As described in U.S. Pat. No. 4,255,106, a dough piece is rolled by a first stage and delivered onto the tray 29 as a sheet designated in FIG. 1 herein by reference numeral 53 which then is fed into the receiving bight of rollers 24,25 of the second stage for further rolling into a sheet 54 of a desired thinner thickness suitable for use as a pizza skin. This finally rolled dough sheet then automatically is perforated at spaced points by the mechanism of the present invention, as indicated by reference numeral 55, to provide the completed pizza skin 56 of FIG. 4.

The dough sheet perforator means of the preferred embodiment comprises a rotatable toothed member indicated generally by reference numeral 57, guide means 58 for the dough sheet 54, and a resilient backup member generally indicated at 59.

The dough sheet perforator 57 is made up of a plurality of star wheels 61 spaced from each other longitudinally of, and secured in any suitable manner to, shaft 62 which is rotatably mounted at each end on the outer casing or support 12 in well known manner including, if desired, the eccentrically mounted discs that may be selectively rotated and held in adjusted position by the manually actuated means 26 of U.S. Pat. No. 4,255,106, whereby proper axial alignment of the star wheel assembly may be assured. The shaft 61 also is provided with suitable gear or pulley means mounted thereon for engagement by the drive means 37 to rotate the dough sheet perforator 57 clockwise, as viewed in FIG. 1.

The guide means 58 is mounted in the casing 12, as by screws 63 extending through suitable apertures in end tabs 64, in proper position to receive the piece of dough 54 from the sheeting rollers 24, 25 and guide the same over and into contact with the ends or tips of the descending toothed members or star wheels 61. To this end, the guide means 58 comprises a stamped or otherwise suitably formed sheet or plate having an angularly disposed upper portion 65, an intermediate vertical portion 66, and a lower reversely angularly extending end portion 67 from which the end mounting tabs 64 extend. As perhaps best seen in FIG. 2, the major lower part of the upper portion 65, the intermediate portion 66, and the upper part of the lower end portion 67 are provided with parallel longitudinally spaced slots 68 which accommodate, and through which, the descending teeth of the several star wheels 61 extend (FIG. 1).

As illustrated in broken lines at 54a in FIG. 1, if the finally rolled sheet of dough 54 sticks for any reason to the upper second stage roller 24, it is separated therefrom by the scraper 31 and the upper portion 65 of guide means 58 prevents it from falling in the wrong direction behind or onto the ascending teeth of the member 57. Also, if the dough sheet 54 sticks to the lower second stage roller 25, it is separated therefrom by the scraper 32 and directed onto the descending teeth of the member 57 which extend through the slots 68 of the guide means 58. Downward movement of the dough sheet 54 thereafter is assisted by the member 57, which is being rotated in synchronism with rollers 24, 25 by the drive means 37, during perforation of the dough thereby, as explained hereinafter, and the lower portion 67 of the guide means 58 insures separation of the perforated sheet 56 from the member 57. It will be understood that any suitable means may be provided for receiving the perforated dough sheet or pizza skin 56, such as the tray 34 shown in U.S. Pat. No. 4,255,106.

The backup unit 59 basically comprises a sheet of spring metal or other suitable material having a longitudinally extending base portion 69 (FIGS. 1 and 3) and a finger portion angularly disposed relative thereto defining substantially vertically depending individual fingers 71 spaced from each other and aligned, respectively, with the perforator members or star wheels 61. As shown in FIG. 1, the base portion 69 is secured in adjustable position for proper engagement of the fingers 71 with their dough perforator members 61, as by means of screws 72, to the upper edge portion of a mounting bracket 73 in turn secured at 74 at its forward portion to the outer casing or support 12, and bolts 75 anchored at their lower ends to the support, extending through suitable apertures in the bracket 73 and having thumb screws 76 for adjustably moving the upper edge portion of bracket 73 vertically. Also, if desired, the apertures in the base portion 69 accommodating the screws 72 may be slotted perpendicularly to the forward edge of the base portion to enable adjustment of the fingers 71.

In any event, each resilient or spring finger 71 of the backup member 59 extends downwardly from the base portion 69 in alignment with, and in the path of, the tips or outer ends of the teeth of its associated star wheel 61 in such manner as to be contacted by the latter and moved or sprung thereby in a counterclockwise direction (viewed in FIG. 1), as to its broken line position illustrated therein, during descending movement of each tooth. Thus, a lineal surface scraping of the tip of each tooth down the associated resilient backup finger 71 is effected, after the dough piece 54 has been perforated at 55 by the tooth to positively assure complete perforation and prevent subsequent forming of any aperture-closing membrane, as in response to the natural memory characteristics of the dough. Consequently, a sheeted dough piece 56 so perforated to provide such apertures 55 may be used as a pizza skin which will not blister during baking.

It is thought that the invention and many of its attendant advantages will be understood from the foregoing description, and it will be apparent that various changes may be made in the form, construction, and arrangement of the parts and in the specifically described steps of the method without departing from the spirit of the invention or sacrificing all of its material advantages, the form and method hereinbefore described and shown in the drawings being merely preferred embodiments thereof.

The embodiments of the invention in which an exclusive property or privilege is claimed are defined as follows:

1. A dough perforator comprising a rotatable star wheel toothed member, means for guiding a sheet of dough over and into contact with said toothed member to be penetrated thereby, and a sheet metal spring backup member engageable by said toothed member to effect a lineal scraping of said toothed member thereon, whereby an aperture is formed completely through said dough sheet to prevent forming of any aperture-closing membrane thereover.

2. A dough perforator according to claim 1, wherein said backup member comprises a spring finger mounted to position a free end thereof in the path of movement of said toothed member.

3. In a dough perforator according to claim 1, means for guiding a perforated sheet of dough and separating the same from said toothed member.

4. In a dough sheeter having rollers for sheeting a dough piece, and drive means for rotating said rollers; dough sheet perforator means, comprising an axially aligned and spaced set of dough sheet perforator members rotated by said drive means, means for guiding a dough sheet into contact with said perforator members, and a backup unit including sheet metal spring members individually cooperating with said perforator members to effect lineal scraping thereagainst of the latter, whereby spaced apertures are formed completely through a dough sheet to prevent forming of any aperture-closing membranes thereover.

5. In a dough sheeter according to claim 4, means for guiding perforated sheets of dough and separating the same from said perforator members.

6. In a dough sheeter according to claim 4, adjustable means for mounting said dough sheet perforator means axially parallel to said rollers.

7. In a dough sheeter according to claim 6, means for adjustably mounting said backup unit relative to said perforator members.

8. A dough sheeter according to claim 7, wherein said backup unit comprises a sheet of spring metal having a longitudinally extending base portion and a finger portion angularly disposed relative thereto defining fingers spaced from each other and individually aligned with said perforator members.

* * * * *